Jan. 21, 1958 P. AUDEMAR 2,820,681
THRUST BEARING STRUCTURE
Filed April 8, 1955 2 Sheets-Sheet 1
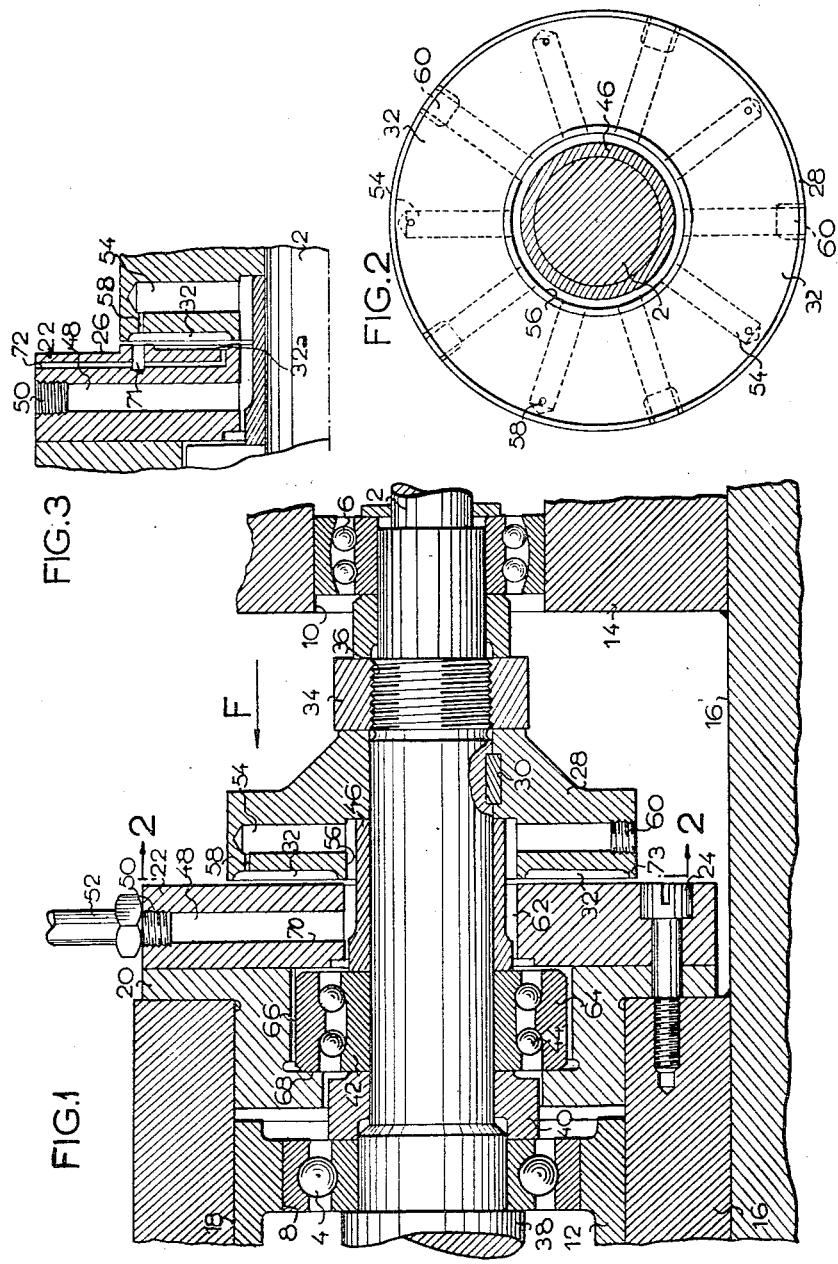
Inventor
P. Audemar
By Glascock Downing Seebold
Attys.

Jan. 21, 1958 P. AUDEMAR 2,820,681
THRUST BEARING STRUCTURE
Filed April 8, 1955 2 Sheets-Sheet 2
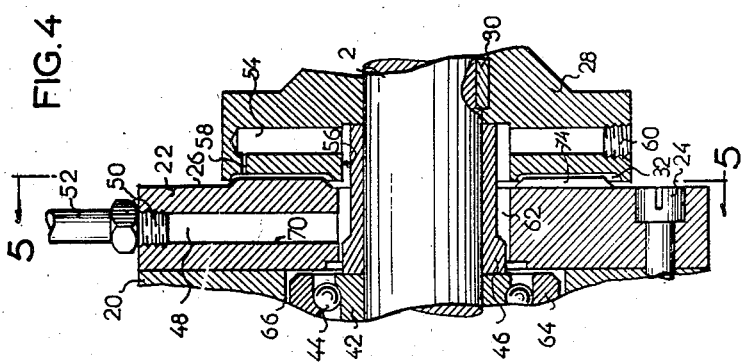
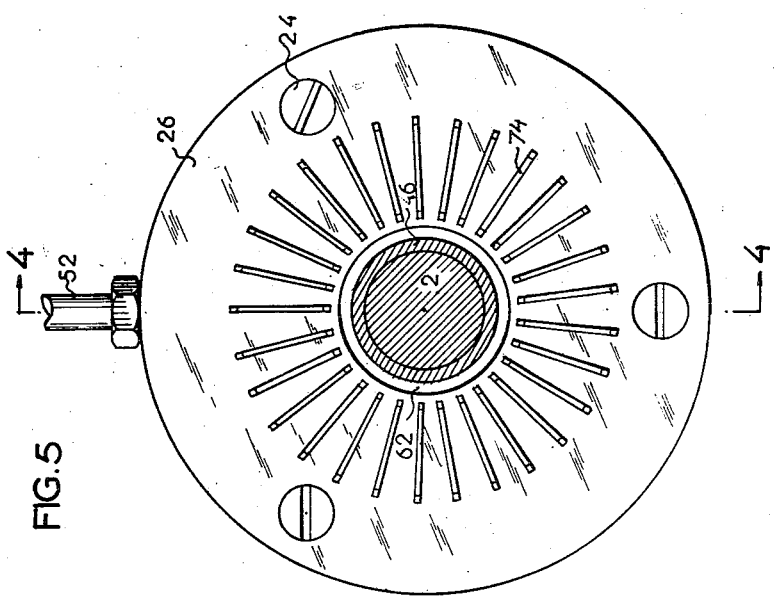
Inventor
P. Audemar United States Patent Office 2,820,681
Patented Jan. 21, 1958

2,820,681

THRUST BEARING STRUCTURE

Pierre Audemar, Mulhouse, France, assignor to Societe Alsacienne de Constructions Mecaniques, Mulhouse, Haut-Rhin, France, a French company Application April 8, 1955, Serial No. 500,229

Claims priority, application France April 14, 1954

5 Claims. (Cl. 308—160)

This invention relates to thrust bearing structures of the type in which a liquid set under pressure by centrifugal forces resulting from the rotation of a rotary member is interposed in an annular chamber provided for this purpose, between an annular surface of a fixed part and an annular surface of the rotary member, so as to maintain in the said annular chamber a liquid pressure increasing with the speed of the rotary member and tending to urge the rotating surface away from the fixed one, suitable means such as axial ball-bearings being provided to limit the relative axial displacement between said rotary member and fixed part, at least in one direction.

In the known thrust-bearing structures of this type, the liquid is set under pressure in the annular chamber proper into which it is fed near the shaft, means being provided to cause rotation of the liquid, so as to generate centrifugal forces to urge the liquid towards the periphery of the chamber to thereby build up the desired liquid pressure in said chamber.

Now, since, in such an annular chamber, the liquid remains in frictional contact with the fixed parts, in spite of the action of the means provided for ensuring its rotation and whatever may be the said means (blades attached to the rotary member, grooves in the wall of said member, etc.), the action of the centrifugal force remains hindered, so that the average pressure of the liquid in the chamber cannot overcome, in the best conditions, a value substantially equal to half the pressure near the outer periphery of said chamber.

The invention has for its purpose to provide a thrust bearing structure of the type described, wherein a liquid pressure is built up in the rotary member proper which is so designed as to cause positive rotation of the liquid without any counteracting friction, the said pressure liquid being continuously fed into the usual annular chamber, to thereby maintain in the latter a far higher average pressure than in the known thrust bearing structures.

For this purpose, it is an object of the invention to provide a thrust bearing structure of the type described wherein the rotary member is hollow, its inner space being fed with liquid near the axis of the rotor, partition means extending in a generally radial direction being provided in said inner space to positively rotate the liquid and the said inner space communicating near its outer periphery with the usual annular chamber.

Another object of the invention is to combine such a pressure building-up rotor with a perfectly smooth annular chamber preferably containing fixed blades, so as to reduce to a minimum the action of the centrifugal force in the said annular chamber, the pressure liquid from the rotor being fed near the periphery of the said annular chamber.

Another object of the invention is to combine the above described pressure building-up rotor with stationary liquid conducting means, provided in the fixed part, to collect liquid at maximum pressure near the periphery of the annular chamber, the said liquid being then re-injected near the inner periphery of the said chamber.

With this last arrangement, the centrifugal force acting in the annular chamber still increases the pressure of the liquid.

It is therefore another object of the invention to combine with a rotor of the type described and the stationary liquid conducting means mentioned above, any conventional means, such as rotary blades, to increase the action of the centrifugal force in the annular chamber by setting the liquid in rotation as positively as possible.

It is to be noted that the two apparently opposed solutions contemplaed above, viz. braking of the rotation of the liquid in the annular chamber, or, on the contrary, speeding up of said rotation to obtain a maximum centrifugal action, are not in fact in contradistinction with each other, the common basic idea being to give to the centrifugal forces of the system, a maximum efficiency, when they are favorable while reducing them to a minimum when they tend to oppose the desired building-up of the liquid pressure.

The invention will be better understood with the following detailed description together with the appended drawings submitted for purpose of illustration only, and not intended to define the scope of the invention.

In these drawings:

Figure 1 is an axial sectional view of a thrust bearing structure according to the invention.

Figure 2 is a cross-sectional view along line 2—2 of Figure 1 taken in the direction of the arrows, Figure 3 is a detailed view of another embodiment of the invention, Figure 4 is a detailed view of a further embodiment of the invention, the same being an axial sectional view along the line 4—4 of Figure 5 taken in the direction of the arrows, and Figure 5 is a cross sectional view along the line 5—5 of Figure 4 taken in the direction of the arrows.

Referring first to Figures 1 and 2, there is shown at 2 a shaft subjected to an axial thrust acting in the direction of the arrow F of Figure 1, i. e. from the right towards the left in this figure. The shaft 2 is journalled on two ball-bearings 4 and 6, the inner races of which rotate with the shaft 2, while their outer races are mounted for free sliding in the bores 8 and 10 of two fixed supports 12 and 14. In other words, both ball-bearings 4 and 6 are exclusively provided to support the radial loads of shaft 2, while they have no action whatever against the axial thrusts exerted on the said shaft.

The fixed support 12 is fixedly secured in frame 16 provided with a bore 18 in which is mounted a block 20 on which bears a plate 22. Screws such as 24 are provided to secure both the plate 22 on the block 20 and these two parts together on the frame 16. The frame 16 as well as the support 14 are fixedly secured on a base plate 16'.

The outer face 26 of the plate 22 is machined flat, to form a bearing surface.

On the shaft 2 is keyed, as shown at 30, a rotary member or rotor 28.

The left-hand face (in Figure 1) of the said rotor 28 is but slightly spaced from the face 26 of the plate 22 and is provided with a continuous annular recess 32. A nut 34 screwed on a threaded portion 36 of the shaft 2 holds the following stack assembly of parts screwed on a shouldering 38 of the shaft 2: the inner race of the bearing 4, a spacing ring 40, the inner race 42 of a ball-bearing 44 provided with two rows of balls as described in detail hereinafter, a spacing sleeve 46 and the hub of the rotor 28.

The plate 22 is provided with a radial passage 48 terminated outwardly by an innerly threaded portion in which is screwed a union 50 for attachment of a pipe 52 communicating with an oil reservoir (not shown).

According to the invention, the rotor 28 keyed on the shaft 2 is provided with a number of radial ducts 54 (five in the example shown). The said ducts communicate at their inner end with a bore 56 of the rotor 28, the said bore having a diameter higher than the outer diameter of the registering portion of the sleeve 46. The said ducts 54 do not open in the periphery of the rotor 28, but communicate with the recess 32 through nozzles 58 parallel with the axis of the shaft 2. For manufacturing facilities, each duct 54 is preferably machined by drilling from outside a diametral hole through the rotor, up to a short distance to its periphery, the mouth of the said hole being subsequently obturated by means of a suitable plug, as shown at 60. As shown in Figure 2, the ducts 54 are regularly spaced around the rotor 28, so that the same, when provided with the necessary plugs undergoes no perturbation of its balance. Alternatively, it is also possible to provide the radial extensions of the ducts 54 with axial ports similar to 58, so as to use also the pressure generated in the said extensions by the rotation of the rotor 28.

The plate 22 is provided with an axial bore 62 having the same diameter as the bore 56 of the rotor 28. The portions of the sleeve 46, registering with the passage 48 of the plate 22 and with the ducts 54 of the rotor 28, as well as the portion intermediate therebetween, have an outer diameter smaller than the diameter of the axial bores 62 and 56. The liquid incoming through the pipe 52 is thus free to flow, through the passage 48 of the plate 22, into the inner ends of the radial ducts 54 of the rotor 28.

As previously mentioned, the device comprises, in the example shown, a ball bearing 44, the inner race 42 of which rotates with the shaft 2. The outer race 64 of the said bearing is housed in a bore 66 of the block 20, the diameter of this last bore being materially larger than the diameter of the outer race 64 of the bearing 44, the function of which is merely to act as a mechanical thrust-bearing during the starting period. For this purpose, the left-hand face of the outer race 64 of the bearing may be brought into contact with a shouldering 68 of the bore 66 of the block 20. Similarly, the other side face of the said outer race may be brought into contact with the face 70 of the plate 22, so as to limit the action of the liquid pressure.

In order to be capable of supporting axial loads in safe conditions, the ball bearing 44 is provided with deep rolling grooves. Moreover, it includes two rows of balls, so as to be capable of acting as a thrust bearing in both axial directions.

Any other suitable type of mechanical thrust-bearing capable of ensuring the same function could be also clearly adopted.

The above described thrust bearing structure operates as follows:

At rest, all parts are in the positions shown in the drawing.

In other words, in the presence of an axial thrust F, the outer race 64 of the ball bearing 44 bears against the shoulder 68 to support the said axial thrust. The left-hand face (in Figure 1) of the rotor 28 lies in the immediate vicinity of the outer face 26 of the plate 22 without, however, any metal-to-metal contact therebetween. The radial ducts 54 and the recess 32 of the rotor 28 are filled with liquid from the above mentioned reservoir through the pipe 52, the passage 48 of the plate 22 and the respective bores 62 and 56 of the plate 22 and rotor 28. The said liquid however is not under pressure, or more precisely, it is under but a very small pressure due to the difference between the levels of the said liquid in the rotor 28 and in the reservoir.

As soon as the shaft 2 is set into rotation, the centrifugal force acting on the liquid contained in the radial ducts 54 of the rotor 28 progressively increases the pressure of the said liquid along the said ducts with a maximum near the periphery of the rotor 28. The said maximum liquid pressure is transmitted through the ports 58 of the rotor into the recess 32. The rotor 28, under the action of the said pressure, takes a bearing on the outer face 26 of the plate 22 and slightly pushes the shaft 2 towards the right (in Figure 1). The gap between the peripheral edge of the rotor 28 and the plate 22 enlarges, the resistance to the escape of the liquid therethrough is reduced, until a condition of equilibrium is reached for which the pressure of the liquid in the recess 32 of the rotor 28 has such a value that the resultant of the unit forces exerted longitudinally by the liquid pressure on the rotor becomes equal to the axial thrust F acting in the opposite direction. It is to be noted that, in these conditions, the outer race 64 no more bears on the shouldering 68 of the bore 66 of the block 20, so that the shaft 2, together with any other element rotating therewith, are held against shifting exclusively by the hydraulic thrust bearing constituted by the film of liquid comprised between the rotor 28 and the plate 22.

In the case when the axial thrust has but a low value, the outer race 64 of the bearing 44 will come into contact with the face 70 of the plate 22.

It is to be noted that in the above described arrangement, the liquid is fed near the periphery of the annular chamber with the maximum value of the pressure built up in the rotor, whereafter the liquid will tend to flow under the action of said pressure from the outer periphery of the annular chamber towards its inner periphery against the action of the centrifugal force therein.

Since said annular chamber is smooth, any positive means to promote rotation of the liquid being omitted, the said centrifugal force urging the liquid towards the periphery of the annular chamber is reduced. Assuming that the mean angular velocity of the liquid in the annular chamber is substantially equal to half the angular velocity of the rotor, due to the fact that, while the rotating wall tends to set the liquid in rotation by friction, the stationary wall tends to oppose the said rotation also by friction and to the same extent. Since, on the other hand, the centrifugal force, as known, is proportional to the square of the angular velocity, it may be admitted that the said centrifugal force, at each point of the annular chamber, will be equal to one fourth of the centrifugal force acting at a point of same radius on the liquid in the ducts of the rotor.

As a result, it may be admitted that the pressure of the liquid near the periphery of the annular chamber is substantially equal to four times the maximum pressure which would be built up therein, if the liquid in the annular chamber were submitted to the only action of the centrifugal forces acting in said chamber. In these conditions, the liquid is urged, in said chamber, from the outer towards the inner periphery under the action of the pressure built up in the rotor, against the action of the centrifugal forces in the chamber, with a force equal to four times the last mentioned centrifugal action. Thus, it may be admitted that near the shaft, the pressure in the chamber is substantially equal to three-fourths of the maximum pressure at equilibrium i. e. for example if the liquid escape at the periphery of the chamber is considered as negligible.

Thus the average pressure in the annular chamber may be assumed to be about one half the sum of the maximum pressure built up in the rotor and three-fourths of the said pressure, or ⅞ of the said maximum pressure, which is a considerable improvement with respect to the known thrust bearing structures wherein, as exposed in the preamble, the said average pressure is about one half of the said maximum pressure.

In the alternative embodiment shown in Figure 3, an annular recess 71 provided in the fixed plate 22 and opening in the outer peripheral zone of the annular chamber 32 in front of the nozzles 58 picks up the major portion of the pressure liquid projected by the said nozzles. The liquid thus picked up is re-injected through passages 72 into the inner peripheral zone of the chamber 32. Since the said liquid has kept substantially the maximum pressure previously built-up in the radial ducts 54, there is established in the said inner peripheral zone a pressure substantially equal to the said maximum pressure. As a result, eventually, the average pressure in the chamber 32 is but slightly different from the said maximum pressure.

The re-entrant portion constituting the annular chamber may be obtained by recessing the fixed and/or the rotating annular surfaces.

In Figure 3, both surfaces are recessed as shown at 32a and 32. In Figure 1, as previously described, the chamber 32 is formed entirely in the rotating member 28. It is obvious that it would be also possible to obtain the desired re-entrant portion by providing one and/or the other of the annular members with inserted circular lips.

Furthermore, the invention is not limited to the examples described and shown and it may be affected with numerous modifications within the reach of those skilled in the art without departing from the spirit of the invention.

In particular, for supporting the axial thrust F during the starting period i. e. before the liquid has reached, in rotor 28, under the action of the centrifugal forces, a pressure sufficient to ensure the above described operation, it is possible, instead of using a ball bearing such as 44, to momentaneously feed in a pressure liquid into the pipe 52 for aiding the provisorily insufficient centrifugal forces in building-up in the recess 32 of the rotor a pressure sufficient to compensate the axial thrust F.

It is also possible to provide any suitable packing means such as a labyrinth joint between the fixed and rotary parts and, in particular, between the rotor 28 and the plate 22. Similarly, it will be advantageous to provide a system for collecting the liquid escaping from the recess 32 between the rotor 28 and the plate 22, and if desired, a system for filtering and re-cycling the said liquid.

It is also possible to provide in the annular chamber 32, means, such as fins or blades 74 tending to prevent the liquid from rotating, so as to reduce to a minimum the centrifugal forces resisting to the building up in the whole chamber of the pressure existing near its periphery. Moreover, the registering annular surfaces used are not necessarily rigorously normal to the axis of rotation; for example, they may be slightly conical.

Finally, a double-acting hydraulic thrust bearing may be easily obtained by sandwiching the rotor between two fixed bearing annular surfaces, and by interposing, on either side of the rotor, an annular chamber between the latter and one of the said annular surfaces, two systems of nozzles being, moreover, provided each for feeding one of the said chambers with liquid set under pressure in the rotor, by the centrifugal forces, either in one single system of radial ducts common to both chambers, or in two separate duct systems. Finally, the inner diameter of the fixed annular surface may be reduced at will, the said surface even being, if desired, a circular one.

What is claimed is:

1. In a fluid thrust bearing, the combination with a rotary shaft capable of slight axial displacements within a limited path, of a stationary member freely surrounding a part of said rotary shaft with an annular clearance and providing an annular surface substantially right-angled with the axis of the shaft, a rotor member adapted to rotate with said rotary shaft and having an annular portion surrounding said shaft with an annular clearance, said annular portion providing an annular surface facing said annular surface of the stationary member with a slight axial clearance variable within the limits of said path, an annular recess provided in at least one of said mutually facing annular surfaces to form a liquid pressure chamber, a plurality of radial liquid passages in said annular portion of the rotor member extending each from the inner periphery of said annular portion to a point near the outer periphery thereof, axial liquid passages in said annular portion of the rotor member to interconnect an outer region of said chamber and the outer ends of said radial passages, and means to conduct liquid to the inner ends of said radial passages through said annular clearance of said stationary member and of said rotor member, respectively, whereby centrifugal force will cause liquid in said radial passages to flow into said chamber through said axial passages.

2. A thrust-bearing structure according to claim 1, wherein said axial passages form each a nozzle.

3. A thrust-bearing structure according to claim 1, wherein said annular chamber is further provided with fixed blade means to oppose rotation of liquid therein.

4. A thrust-bearing structure according to claim 1, wherein said stationary member is provided with means to by-pass pressure-liquid from the outer peripheral zone of said annular chamber into its innermost zone.

5. A thrust-bearing structure according to claim 1, in which said axial displacements of the shaft are limited by a roller bearing, the inner race of which is mounted on said shaft and the outer race of which is axially movable between two opposite abutment surfaces formed on said stationary member.

References Cited in the file of this patent

UNITED STATES PATENTS

| 1,436,265 | Kingsbury et al. | Nov. 21, 1922 |
| 2,570,682 | Imbert | Oct. 9, 1951 |
| 2,633,392 | Luenberger | Mar. 31, 1953 |